United States Patent
Holly et al.

(10) Patent No.: US 6,567,657 B1
(45) Date of Patent: May 20, 2003

(54) SCP AND MSC FAULT RECOVERY PROCESS AND SIGNALING NODE FAILURE REPORTING MECHANISM

(75) Inventors: Gerald Holly, Brossard (CA); Akilan Tiburtius, Montreal (CA); Arturo Vega, Montreal (CA); Hanh Duy Vo, St-Laurent (CA); Nadia Bishai, Town of Mount Royal (CA); Jacques Bugnon, Repentigny (CA); David Strickland, Plano, TX (US)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 09/400,140

(22) Filed: Sep. 21, 1999

Related U.S. Application Data

(60) Provisional application No. 60/103,394, filed on Oct. 7, 1998.

(51) Int. Cl.[7] .................. H04M 11/00; H04M 15/00
(52) U.S. Cl. .................. 455/408; 455/406; 455/409; 455/405; 379/114.01; 379/114.04; 379/114.17; 379/114.2; 379/114.28
(58) Field of Search .................. 455/405, 406, 455/408, 409; 379/111, 114.01, 114.04, 114.15, 114.17, 114.2, 114.28

(56) References Cited

U.S. PATENT DOCUMENTS

| | | | |
|---|---|---|---|
| 5,265,155 A | | 11/1993 | Castro .................. 379/112 |
| 5,896,441 A | * | 4/1999 | Akazawa et al. .................. 379/9 |
| 5,909,485 A | * | 6/1999 | Martin et al. .................. 379/114.2 |
| 6,453,029 B1 | * | 9/2002 | Campbell .................. 379/114.2 |

FOREIGN PATENT DOCUMENTS

| | | |
|---|---|---|
| EP | 0 794 651 A1 | 9/1997 |
| WO | WO 98/27715 | 6/1998 |
| WO | WO 98/37689 | 8/1998 |

OTHER PUBLICATIONS

International Search Report PCT/SE99/01752, dated May 30, 2000.

* cited by examiner

*Primary Examiner*—Nay Maung
*Assistant Examiner*—Raymond Persino
(74) *Attorney, Agent, or Firm*—Jenkens & Gilchrist; Sandra Beauchesne

(57) ABSTRACT

A method and system for automatically adjusting charges to a pre-paid account in a telecommunications or distributed processing network following a failure in the network. After a service that is chargeable against the pre-paid account is initiated in the network, a failure in the network is detected. The failure prevents a charging node from receiving event data relating to the pre-paid account. After recovery from the failure, a message is sent to the charging node containing service status information. The charging node adjusts the account balance in accordance with the service status information.

29 Claims, 4 Drawing Sheets

SCP AND MSC FAULT RECOVERY PROCESS AND SIGNALING NODE FAILURE REPORTING MECHANISM

CROSS-REFERENCE TO RELATED APPLICATION

The present application claims priority from and incorporates by reference previously filed U.S. Provisional Application for Patent Ser. No. 60/103,394, filed Oct. 7, 1998, entitled "Signaling Node Failure Reporting Mechanism for a Radio Telecommunications Network."

BACKGROUND OF THE INVENTION

1. Technical Field of the Invention

The present invention relates in general to the exchange of network information in a communications system, and in particular to data recovery in connection with pre-paid telecommunications services.

2. Description of Related Art

In accordance with most cellular service plans, cellular service providers charge for mobile telephone services on a monthly basis. Accordingly, the service providers keep track of the amount of time each subscriber uses his or her mobile telephone during a one month period. Then, at the end of the month, the service provider bills the subscriber based on his or her usage during that month.

Generally, cellular service plans are billed at a flat rate that allows the subscriber to use his or her mobile telephone for a certain number of minutes each month without incurring additional charges. Thus, if the subscriber's usage is at or under the allowed number of minutes (i.e., the included minutes), the subscriber simply pays the flat rate for that month. On the other hand, if the subscriber uses more than the number of included plan minutes, the subscriber pays a per minute charge for the excess minutes. In either scenario, additional charges may also apply depending on the type of calls that are made or received by the subscriber. For example, separate long distance and international charges generally apply, and subscribers might also be subject to additional charges for calls that are made or received when the mobile telephone is "roaming" (i.e., when the subscriber is outside of a defined home service area or is in an area served by a different cellular service provider).

As a cellular telephone call is routed through the network during call set-up, and thereafter handled, the switching nodes involved in the call generate billing records containing charging data relating to the ongoing cellular call. This charging data includes details concerning the call such as an identification of the calling and called parties, party location information, routing information, switching information, and other call related information. In order to differentiate between the many cellular calls being handled, and to reconcile multiple billing records between different network elements to properly charge for each individual cellular telephone call, each call is assigned a unique billing identification number. Based on the signaling, this billing identification number may be provided along with the charging information in each billing record report sent by a switching node to the billing center. The billing center stores this information for use in calculating whether the subscriber has exceeded his or her included plan minutes for that month and whether any additional charges apply.

In connection with the ongoing development of Wireless Intelligent Network (WIN)-phase 2, new charging services are being designed. For example, WIN-phase 2 is being designed to offer pre-paid accounts for mobile subscribers. A pre-paid account allows a mobile subscriber to pre-purchase a certain dollar amount of cellular telephone services. In contrast to a conventional cellular service plan, in which included plan minutes that are not used in a particular month are lost, a pre-paid account balance is typically carried over from month to month until it is fully depleted based on the number, length, and type of calls that are made or received by the cellular subscriber. Depending on the service agreement, however, there may be a time limit on how long the balance can be carried over. In addition, account information associated with a pre-paid account is maintained at a service control point (SCP) in the operator's network. The SCP, for example, maintains account balance information, the number of minutes left for a particular calling rate, and ordering information for additional pre-paid purchases. In connection with call set-up and during a subsequent ongoing call, the SCP deducts money (or time, or credit) from the account balance at an appropriate rate for the particular type of call.

Because the SCP nodes control all of the account information for a particular mobile telephone, however, the SCP nodes contain fairly sensitive information from an account perspective. Failures in the network might result in the SCP being unaware of events involving the mobile telephone, such as call originations or terminations. Such failures can cause significant inaccuracies in the billing information maintained in the SCP by, for example, permitting the cellular subscriber to use cellular services without being charged (i.e., a runaway call) or causing the subscriber's balance to be erroneously depleted (i.e., runaway charging). Similar billing inaccuracies can also result in cases of an SCP restart or a restart of some other node in the network that causes a loss of data.

In the case of a runaway call, a cellular service provider is essentially providing services without collecting revenue, thereby reducing profitability for the service provider. In the case of runaway charging, on the other hand, a subscriber is essentially being charged for services that have not been provided, which, if not corrected, can result in customer dissatisfaction. Thus, cellular service providers have an interest in avoiding both runaway call and runaway charging situations. When certain portions of the network that are critical to maintaining accurate account balance information are out of service, however, it can be difficult or impossible to avoid charging errors. There is a need, therefore, for a system and method for recovering data relating to pre-paid subscriber accounts when a portion of the cellular network is out of service for a more than an inconsequential period. Such a method and system would allow charging errors to be corrected or otherwise accounted for as soon as possible after the service outage is discovered.

SUMMARY OF THE INVENTION

The present invention comprises a method and system for automatically adjusting charges to a pre-paid account balance following a temporary failure in a network. In accordance with normal pre-paid telephone service operating procedures, a call connection or other "on demand" telecommunications service is initiated (e.g., in response to a call set-up request). In the context of pre-paid cellular service, these call connection services and other types of services are charged against an account balance for a subscriber station having a pre-paid service agreement. Charging operations are performed by a charging node in the network.

In accordance with one embodiment of the invention, the call connection or other service is terminated during a temporary failure in the network, such as a failure of a switching node or charging node. The failure prevents the charging node from being informed of the service termination until after the failure has been corrected. After a recovery from the failure, a message is sent to the charging node containing call connection termination information or other service termination information. Based on the received termination information, the charging node adjusts the account balance for the subscriber station. Preferably, the adjustment involves computing the time for which the call or other service was provided to the subscriber and adjusting the account balance such that the total amount charged for the call or other service corresponds to the computed time.

In accordance with another embodiment of the invention, a fault recovery process is performed in connection with a mobile switching center (MSC) failure that causes all of the calls being handled by that MSC to be dropped. Once the MSC recovers, it sends a termination information message to the charging node indicating that an MSC failure occurred and indicating the time at which the failure occurred. As a result, the charging node adjusts the account balance based on the received termination information, thereby preventing runaway charging.

In another embodiment of the invention, a charging node failure occurs that temporarily prevents the charging node from receiving service termination information. Once the charging node recovers from the failure, it requests a status update from its associated switching nodes. In response, each switching node returns a list of all active calls handled by that switching node. If the list received by the charging node does not include a particular previously initiated call for which no termination notification has been received, such absence of the call from the list constitutes an indication that the call was terminated during the failure. On the other hand, if the list received by the charging node does include a particular previously initiated call, the charging node knows that such call is still ongoing and can continue charging for the call. Using this procedure, runaway charging and runaway calling can be avoided. In particular, this procedure prevents the charging node from continuing to charge for calls that were terminated during the charging node failure, thereby preventing runaway charging. Similarly, this procedure allows the charging node to continue charging for calls that are still ongoing, thereby preventing a runaway call.

In accordance with an alternative embodiment, a switching node stores termination information for call terminations that occur during a charging node failure and that are not acknowledged by the charging node. After recovery from the failure, the charging node requests a status update from its associated switching nodes. In response to the status update request, the switching node returns data indicating which calls were terminated and the time at which the termination occurred. Using this information, the charging node adjusts the account balance to account for the termination, thereby preventing runaway charging and runaway calls.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
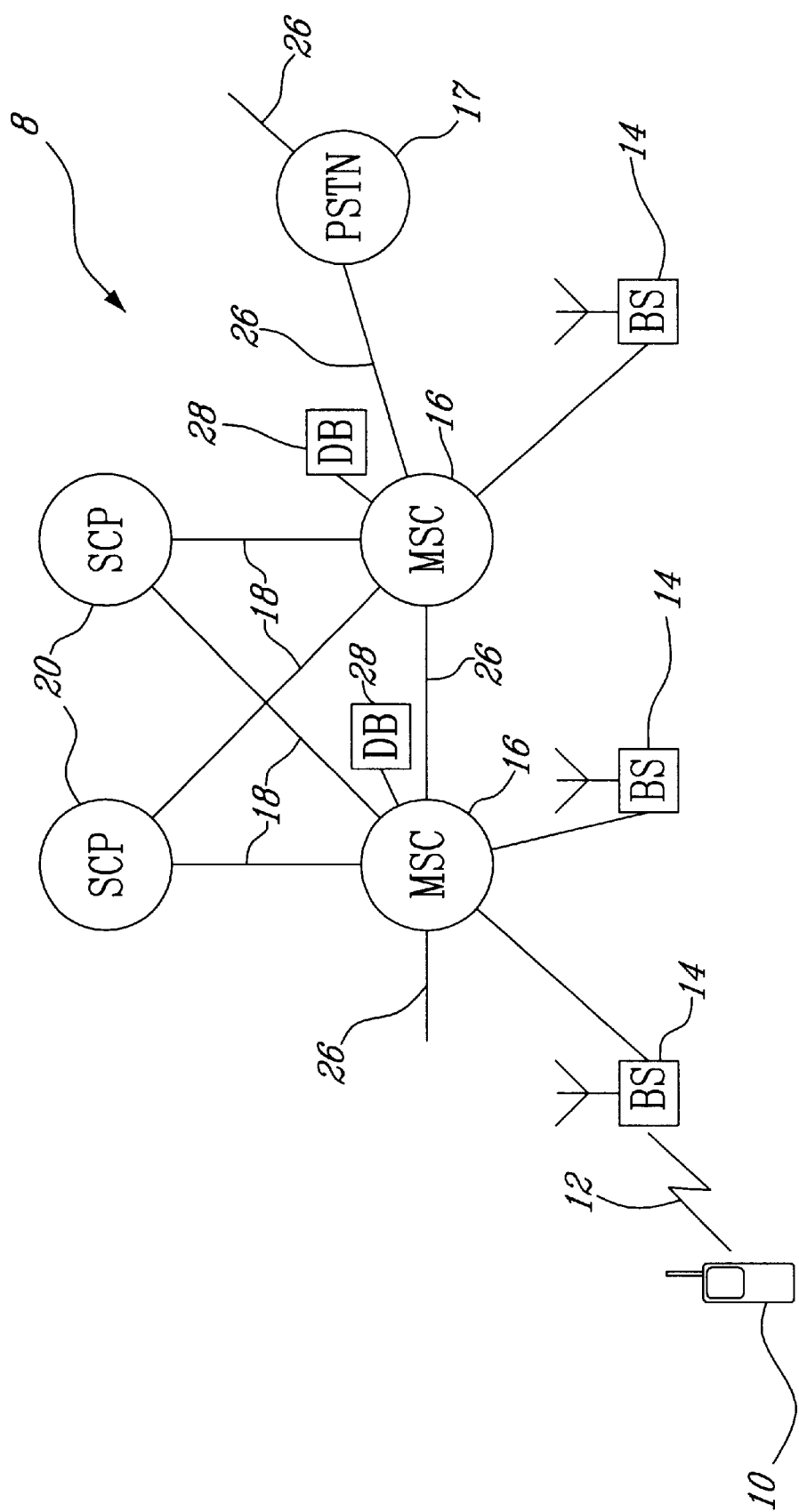
FIG. 1 is a portion of a cellular telecommunications network for use in connection with a pre-paid, mobile subscriber station.

Reference is now made to the Drawings wherein like reference characters denote like or similar parts throughout the various Figures. Referring now to FIG. 1, there is illustrated a portion of a cellular telecommunications network 8 for use in connection with a pre-paid, mobile subscriber station 10. The network includes a mobile switching center (MSC) 16 that is used for routing calls to and from the mobile station via a base station 14 (or some other mechanism for providing a radio access) that is in communication with the mobile station 10 over an air interface 12. The network also includes a service control point (SCP) 20. In the context of the present invention, the SCP 20 is used for storing account information for a pre-paid subscriber. This account information can include an account balance, rating data, and ordering information for the prepaid subscriber. The account balance can be defined in terms of a monetary amount, a number of credits, a number of minutes remaining, or some other quantifiable value. Once the SCP 20 receives the subscriber profile data, it stores that data. The SCP 20 can then access the subscriber profile data in connection with services that are provided to the mobile station 10.

When the MSC 16 receives a request from the mobile station 10 to initiate a call, the MSC 16 forwards the call data, such as the numbers of the calling party and the called party, to the SCP 20 via a signaling connection 18. The SCP 20 then uses the call data to calculate a rating factor for the call (i.e., a rate at which deductions will be made from the pre-paid subscriber's account balance). The rating factor is based, for example, on the predefined rating data in the subscriber profile in connection with a determination of whether the subscriber wants to call a local, long distance, or international number. In addition, the calculation of the rating factor can include a determination of whether the subscriber has enough money left in the account balance to complete the requested call. Once the SCP 20 returns an acknowledgment indicating that the call can proceed, the MSC 16 also routes the call via signaling and trunk connections 26 to other MSCs 16, if the called party is another mobile subscriber located within the same mobile telecommunications network, and/or to a public switched telephone network (PSTN) 17 (or to a public land mobile network (PLMN), for access to other networks, if the called party is located outside of the current network.

After the MSC 16 notifies the SCP 20 of the initial call information, the MSC 16 notifies the SCP 20 of all subsequent actions involving the call, such as a call answer or disconnection, so that the SCP 20 can make appropriate adjustments to the account information (e.g., by starting to deduct from the account balance or by stopping deductions from the account balance). In addition, updates confirming that the call is still ongoing can be sent in response to periodic requests from the SCP 20.

In connection with an incoming call, the pre-paid charging procedure is similar to that of a call origination. In particular, the MSC 16 notifies the SCP 20 of the call set-up request and the SCP 20 calculates an appropriate rating factor. This rating factor can depend, for example, on whether the subscriber is not in his home area, and thus whether roaming charges apply.

Generally, in both the call origination and incoming call scenarios, the SCP 20 begins to deduct from the account balance for the pre-paid subscriber upon being notified of a call answer although, in some cases, deductions from the account balance might begin as soon as the call set-up request is received. Thereafter, periodic deductions from the account balance are made as the call is ongoing. During the call, the SCP 20 can also monitor the account balance to determine if it goes below a preselected low balance threshold. If so, the SCP 20 instructs the MSC 16 to send a low balance notification to the mobile station 10. If the call continues, the account balance can become completely depleted. In such a case, the call can be terminated at the direction of the SCP 20, and no further use of the mobile station will be permitted until the subscriber adds money to the account. When the call ends, the SCP 20 is informed of the call termination and ceases to deduct from the account balance.

The maintenance of accurate account information in the pre-paid subscriber context is dependent upon the MSC 16, which handles call processing, informing the SCP 20, which handles charging issues, of the call status for a particular mobile station 10. These communications between the MSC 16 and the SCP 20 are important because they permit the SCP 20 to know when to start and when to stop deducting from the subscriber's account balance and because they allow the MSC 16 to know when a call should be terminated because the mobile subscriber's account balance has been fully depleted. Partial and/or temporary failures in the network 8, however, can interfere with the capacity to perform these functions.

For example, a failure in the SCP 20 might prevent the MSC 16 from being able to communicate with the SCP 20 (i.e., because of the SCP 20 failure, the SCP 20 is unable to receive data from or send data to the MSC 16). If the MSC 16 receives a call set-up request during such a failure, the call set-up request will typically be denied because it is not possible to perform the necessary call rating calculations. Accordingly, the MSC 16 sends a notification to the pre-paid subscriber station 10 that the call attempt was unsuccessful.

In the case of calls that are ongoing when the SCP failure occurs, on the other hand, it is preferable to allow the ongoing call to continue. Because of the SCP failure, however, the MSC 16 cannot inform the SCP 20 when the call is disconnected or if the call is still ongoing. Therefore, the SCP 20 might continue billing for the call until the subscriber's account balance is fully depleted (i.e., runaway charging), or the mobile station might be able to continue a call indefinitely without being charged (i.e., a runaway call). In accordance with one embodiment of the present invention, the SCP 20, following recovery, recognizes that a failure has occurred and requests from the MSC 16 a list of all of the active calls. In response, the MSC 16 scans all calls that are ongoing in the MSC 16 and sends a list of those calls to the SCP 20. For calls that are included on the list, the SCP 20 can simply continue charging until a disconnect message is received. In cases where the SCP 20 records indicate that a call is ongoing, but the call is not identified by any MSC 16 in response to the SCP request (i.e., none of the attached MSCs 16 identified the call as ongoing), the SCP 20 assumes that the call terminated during the temporary SCP failure. In other words, the absence of the call from the received active call list constitutes an indication that the call terminated during the failure. The SCP 20 can then apply an appropriate charging algorithm; for example, it can apply a minimum charge or completely write off the call.

In an alternative embodiment, if the MSC 16 is unable to communicate with the SCP 20 regarding a call disconnection because of the SCP failure, the MSC 16 stores information about when the disconnect action occurred. This information is stored in a database (DB) 28 associated with the MSC 16. In particular, the MSC 16 stores this information in cases where a disconnect message is sent by the MSC 16 to the SCP 20 but the SCP 20 fails to acknowledge the disconnect message. To prevent the database 28 from becoming congested, the length of time that this information is stored, or the amount of data stored, can be controlled by a configurable size sliding window. Upon recovery from the failure, the SCP 20 requests from the MSC 16 an update relating to call data that could not be communicated during the failure. As a result, the MSC 16 retrieves the call data stored in the database 28 and sends it to the SCP 20. The SCP 20 can then determine the time at which each call ended, or whether the call is still ongoing, and can adjust the pre-paid account balances as appropriate.

In accordance with another embodiment of the present invention, complete failure in the serving MSC 16 might also cause all calls that are ongoing at that MSC 16 to be disconnected. In such a case, the MSC 16 stores data indicating the time of the failure in the database 28. Because such a failure will generally prevent the MSC 16 from informing the SCP 20 of the failure event, the SCP 20 will generally assume that the call is still ongoing and will continue to deduct from the pre-paid subscriber's account balance. Deductions occurring after a call termination that is caused by an MSC failure can be credited to the account balance. Once the MSC 16 recovers from the failure, the MSC 16 sends a notification message to all SCPs 20 that were controlling pre-paid calls handled by the MSC 16 at the time of the failure. The message notifies the SCPs 20 of the time the failure occurred, thereby allowing the SCPs 20 to re-adjust the subscribers' accounts based on the time of the failure that caused the call to end.

Figure 2:
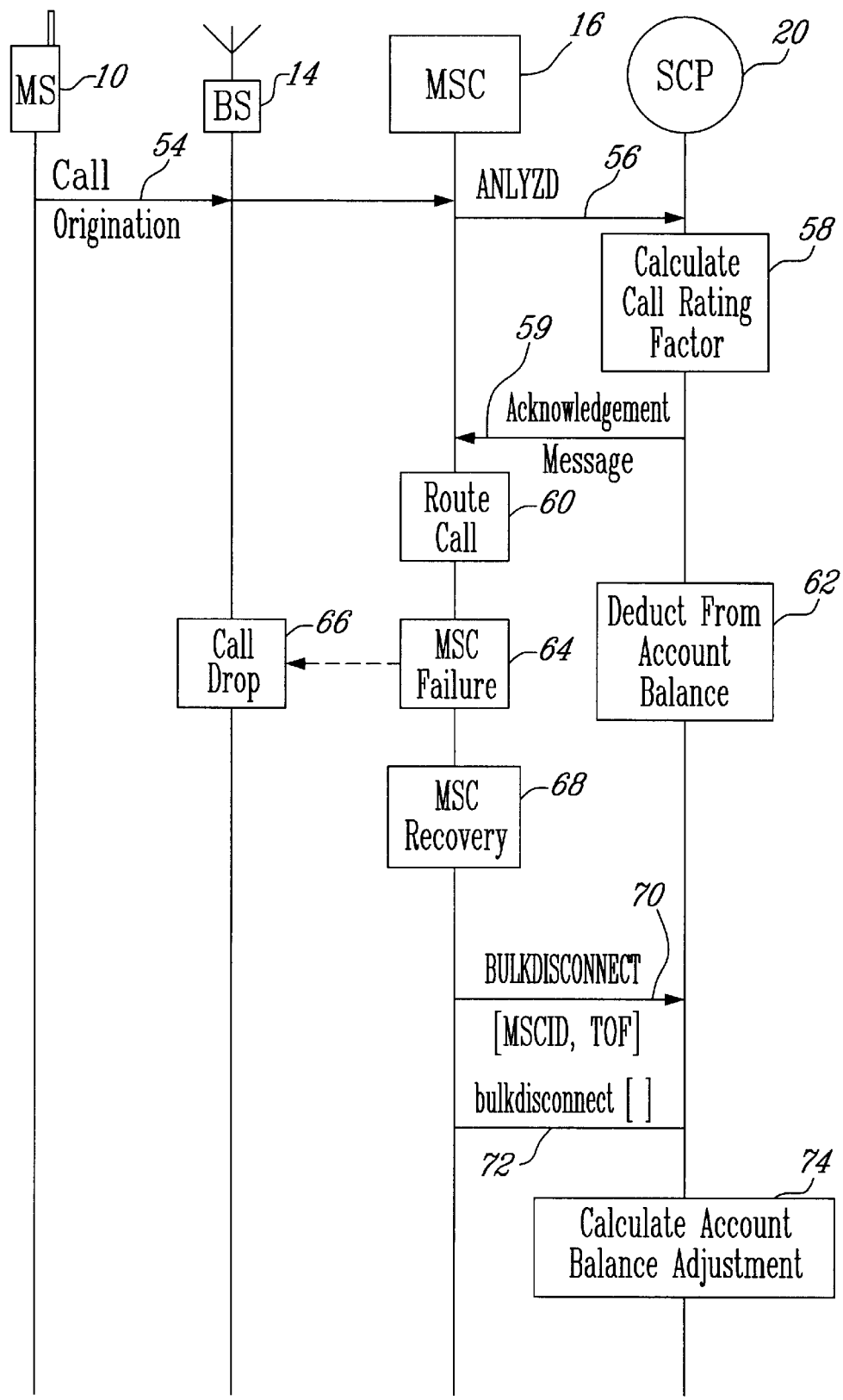
FIG. 2 is a message flow and signaling diagram illustrating a method, in accordance with one preferred embodiment of the present invention, for adjusting a pre-paid subscriber's account balance following a failure at the mobile switching center.

Referring now to FIG. 2, there is shown a message flow and signaling diagram illustrating a method, in accordance with one preferred embodiment of the present invention, for adjusting a pre-paid subscriber's account balance following a failure at the MSC 16. When the mobile station initiates a call to a selected called party, a call origination message 54 is sent to the serving MSC 16 via a base station 14. The MSC 16 sends an "ANLYZD" message 56 containing information about the call to the SCP 20. For example, the "ANLYZD" message 56 can include the called party number and also a billing identification number for the call. The information in the "ANLYZD" message 56 is used by the SCP 20 at step 58 to calculate a call rating factor for the call. The SCP 20 then sends an acknowledgment, responsive to the "ANLYZD" message, indicating that call set-up can proceed at step 59. At step 60 the MSC 16 begins the call set-up procedure by routing the call through the network 8 in accordance with the called party number. Although the process shown in FIG. 2 illustrates a call origination from the mobile station 10, it will be recognized that the same general process applies to calls received by the mobile station 10. In particular, if a call directed to the mobile station 10 is received at the serving MSC 16, the MSC 16 sends an "ANLYZD" message 58 to the SCP 20 for purposes of call rating in connection with the received call.

Once the appropriate call rating factor has been calculated, the SCP 20 begins to deduct from the subscriber s account balance at step 62. Charges can begin as soon as the "ANLYZD" message 58 is received or alternatively when a call answer indication is received by the SCP 20. In the embodiment of the invention depicted in FIG. 2, it is assumed that a complete MSC failure occurs at step 64 while the call is ongoing. This MSC failure causes all of the calls currently being handled by the MSC 16 to be dropped at step 66. However, because the MSC 16 is temporarily out of service, it is unable to inform the SCP 20 that the call has ended. As a result, the SCP 20 does not know to stop charging the subscriber's account.

Eventually, the MSC 16 recovers from the failure at step 68. At that point, the MSC 16 sends a "BULKDISCONNECT" message 70 to the SCP 20 (or to all SCPs 20 associated with the MSC 16) to inform the SCP 20 that all calls being handled by the MSC 16 were dropped. The "BULKDISCONNECT" message 70 includes the identity of the MSC 16 and the time of failure. The SCP 20 then scans all calls that were ongoing in that MSC 16 (and for which no disconnect message has been previously received) and sends a "bulkdisconnect" return result message 72 to the MSC 16 to acknowledge receipt of the "BULKDISCONNECT" message 70. At step 74, the SCP 20 adjusts the account balance for mobile stations 10 involved in the scanned calls, in accordance with the received time of failure data.

As an alternative, the MSC 16, upon recovery, can scan its records to identify a billing identification number for each pre-paid subscriber call that was ongoing at the time of failure. The MSC 16 can then send to the SCP 20 a "BULKDISCONNECT" message 70 containing a list of billing identification numbers and time of failure information for such calls. The SCP 20 uses this information to adjust the account balance for subscribers that were involved in the identified calls at the time of the MSC failure.

Figure 3:
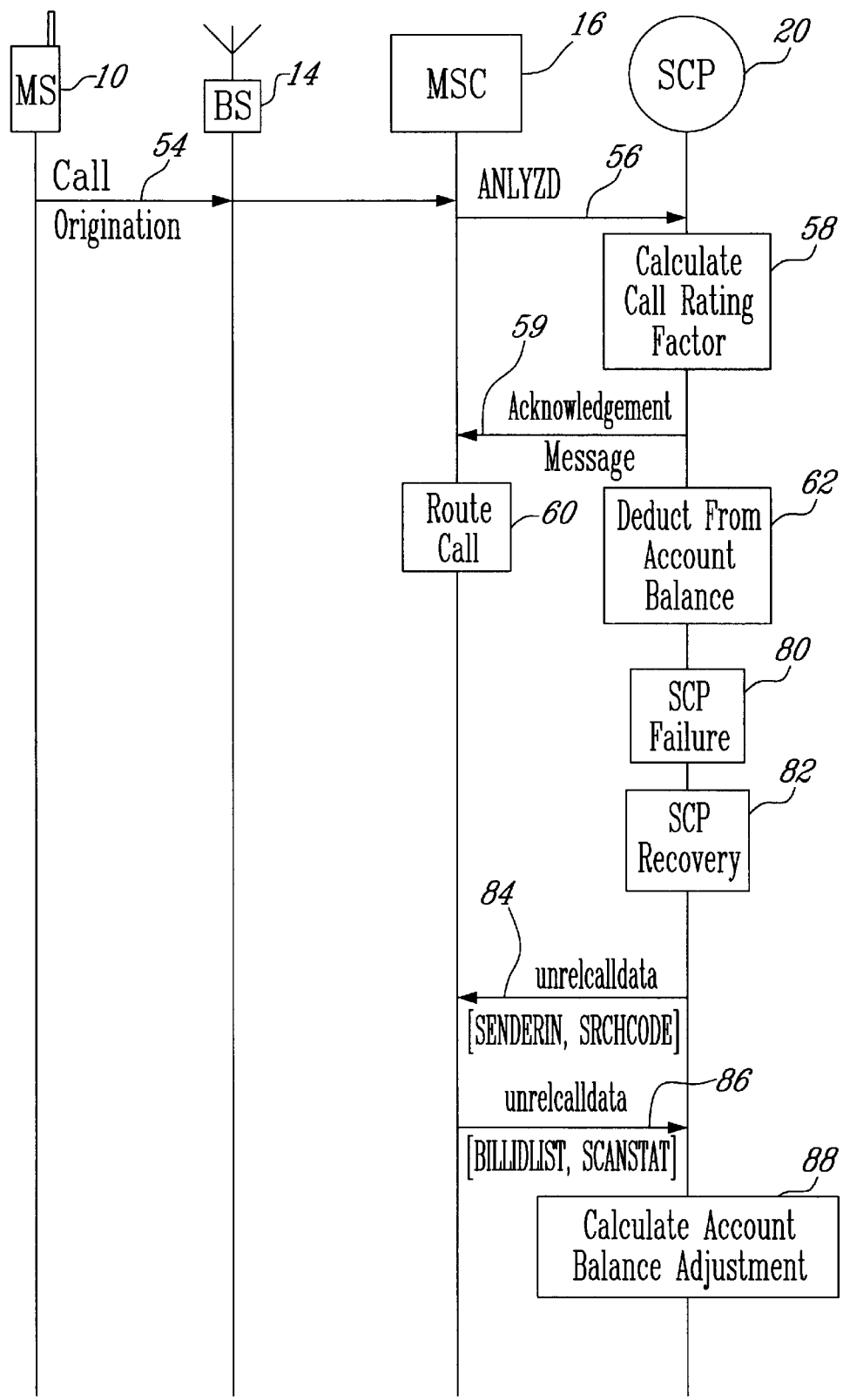
FIG. 3 is a message flow and signaling diagram illustrating a method, in accordance with another embodiment of the present invention, for adjusting a pre-paid subscriber's account balance following a failure at the service control point.

Referring now to FIG. 3, there is shown a message flow and signaling diagram illustrating a method, in accordance with another preferred embodiment of the present invention, for adjusting a pre-paid subscriber's account balance following a failure at the SCP 20. In this embodiment, the call set-up procedures (messages and steps 54–62) are the same as in the MSC failure described above in connection with FIG. 2. As with the MSC failure embodiment, although the process shown in FIG. 3 illustrates a call origination from the mobile station 10, it will be recognized that the same general process applies to calls received by the mobile station 10.

In this embodiment of the invention, however, it is assumed that an SCP failure occurs at step 80 while the call is ongoing. The SCP failure prevents the SCP 20 from being notified when ongoing calls are subsequently disconnected. As a result, the SCP 20 does not know whether to continue charging the subscriber's account for the call. In connection with the SCP 20 recovery from the failure at step 82, the SCP 20 recovers data identifying the call (i.e., a billing identification number or subscriber information identifying the call), the start time of the call, and data identifying which MSCs 16 were handling pre-paid calls for subscribers served by the SCP 20. The SCP then requests call update information from the identified MSCs 16 by sending an unreliable call data ("UNRELCALLDATA") message 84 to the MSC 16. The "UNRELCALLDATA" message 84 includes parameters containing an identification number for the sending SCP node 20 ("SENDERIN") and indicating that a search for active calls should be initiated by the MSC 16 ("SRCHCODE").

In response to the "UNRELCALLDATA" message 84, the MSC 16 scans its call data to determine which of its ongoing pre-paid calls are served by the sending SCP 20 and are still ongoing. The MSC 16 then sends an "unrelcalldata" return result message 86 containing a list of billing identification numbers ("BILLIDLIST") for the calls identified during the scan and a scan status parameter ("SCANSTAT") indicating if the scan is complete. The list of billing identification numbers preferably includes a parameter indicating the number of billing identification numbers included in the message and a separate billing identification number parameter ("BILLID") for each call identified during the scan.

If the scan status parameter indicates that the scan is not complete, the SCP 20 sends another "UNRELCALLDATA" message 84 having a "SRCHCODE" parameter indicating that the MSC 16 should continue the search for active calls. In response, the MSC 16 sends an "unrelcalldata" return result message 86 containing additional billing identification numbers. This process (steps 84 and 86) continues until the scan status parameter indicates that the scan is complete.

Because the billing identification numbers received from the MSC 16 identify calls that are still ongoing, the SCP 20 can continue charging for the identified calls. On the other hand, if the records of the SCP 20 indicate that a particular call is active in the MSC 16 but the MSC 16 does not return a billing identification for that call, the SCP 20 infers that the call was terminated during the SCP failure period. The SCP 20 then applies its own internal charging algorithm at step 88 to adjust the account balance for the subscriber involved in the terminated call. For example, the SCP 20 can apply a minimum charge, it can charge only for the time between call set-up and the SCP failure, or it can completely write off the call. Although FIG. 3 illustrates an embodiment of the invention in which there is a failure at the SCP 20, it will be understood that the same procedure can be utilized in connection with other types of failures in the network. For example, if a failure or error occurs that prevents the SCP 20 from receiving call data during a particular period, an "UNRELCALLDATA" message 84 can later be sent to recover data relating to ongoing calls. This situation might arise where the SCP 20 sends a periodic status request for a call but does not receive a response to the request. The SCP 20 might later send an "UNRELCALLDATA" message 84, or some other similar message, to retrieve data relating to ongoing calls.

Figure 4:
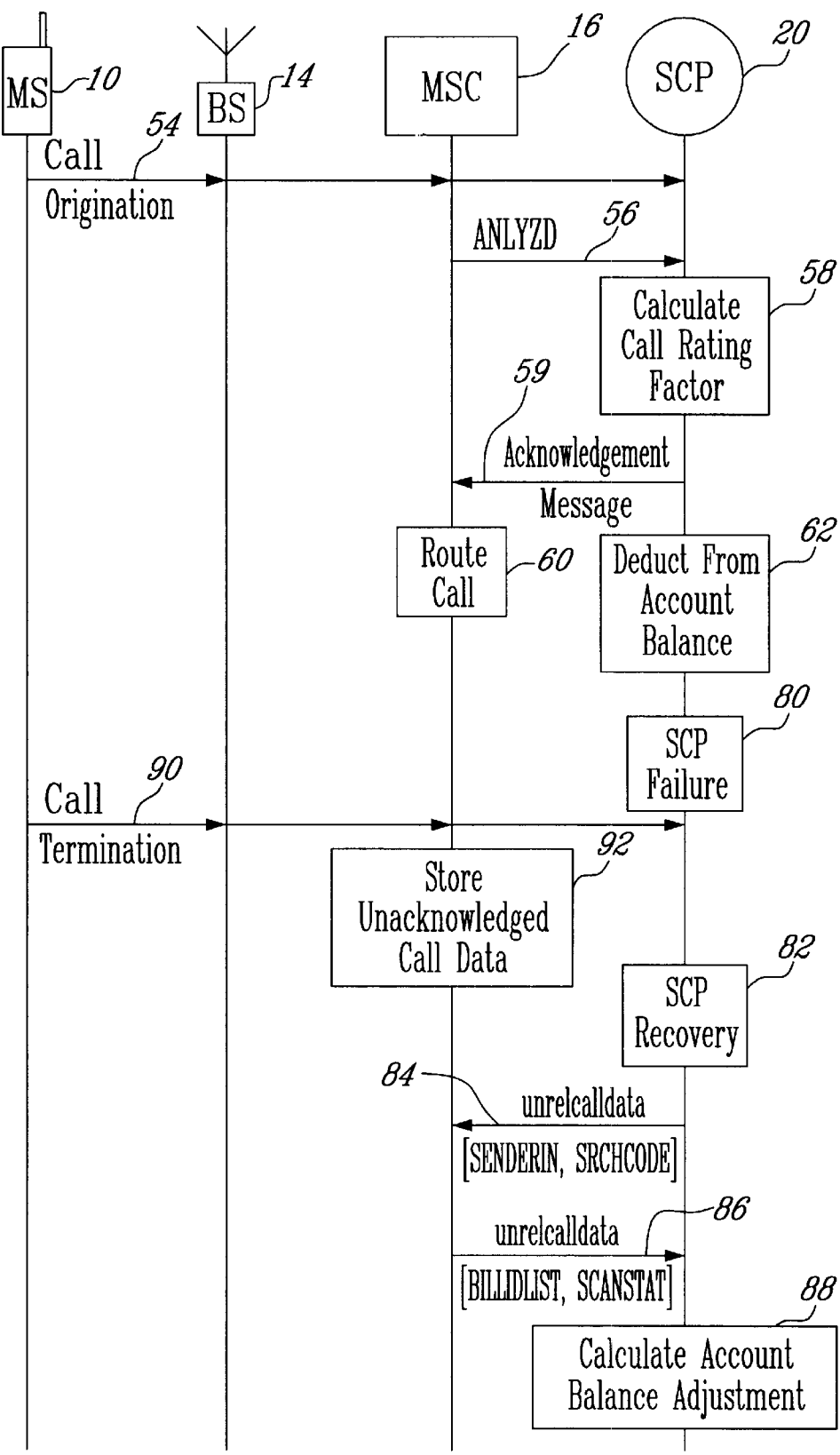
FIG. 4 is a message flow and signaling diagram illustrating a method, in accordance with yet another embodiment of the present invention, for adjusting a pre-paid subscriber's account balance following a failure at the service control point.

Referring now to FIG. 4, there is shown a message flow and signaling diagram illustrating a method, in accordance with yet another embodiment of the present invention, for adjusting a pre-paid subscriber's account balance following a failure at the SCP 16. In this embodiment, the call set-up procedures (messages and steps 54–62) are the same as in the embodiments described above in connection with FIGS. 2 and 3. As with the previously described embodiments, although the process shown in FIG. 4 illustrates a call origination from the mobile station 10, it will be recognized that the same general process applies to calls received by the mobile station 10.

In this embodiment, it is again assumed that an SCP failure occurs at step 80 while the call is ongoing. During the SCP failure period, the mobile station 10 terminates its call. Although the MSC 16 forwards the termination information to the SCP 20, the SCP failure prevents the SCP 20 from receiving the call termination information. As a result, the SCP 20 might continue charging the subscriber's account. Alternatively, the SCP 20 might have stopped charging for the call upon SCP failure. When the MSC 16 does not receive an acknowledgment of the call termination information from the SCP 20, however, it stores the billing identification number for the terminated call in a database 28 associated with the MSC 16. Preferably, the MSC 16 should also store the time at which the call ended.

Once the SCP 20 recovers from the failure at step 82, the SCP 20 recovers data identifying the call (i.e., a billing identification number or subscriber information identifying the call), the start time of the call, and data identifying which MSCs 16 were handling pre-paid calls for subscribers served by the SCP 20. The SCP then requests call update information from the identified MSCs 16 by sending an unreliable call data ("UNRELCALLDATA") message 84 to the MSCM 16. The "UNRELCALLDATA" message 84 includes parameters containing an identification number for the sending SCP node 20 ("SENDERIN") and indicating that a search for call termination data should be initiated by the MSC 16 ("SRCHCODE").

In response to the "UNRELCALLDATA" message 84, the MSC 16 scans its database 28 to identify terminated pre-paid calls for which no acknowledgment of the call termination information was received from the sending SCP 20. The MSC 16 then sends an "unrelcalldata" return result message 86 containing a list of billing identification numbers ("BILLIDLIST") for the calls identified during the scan and a scan status parameter ("SCANSTAT") indicating whether the scan is complete. The "unrelcalldata" return result message 86 also indicates the time of day ("TOD") at which each call ended and a time of day offset ("TDO").

If the scan status parameter indicates that the scan is not complete, the SCP 20 sends another "UNRELCALLDATA" message 84 having a "SRCHCODE" parameter indicating that the MSC 16 should continue the search for terminated calls. In response, the MSC 16 sends another "unrelcalldata" return result message 86 containing additional billing identification numbers. This process (steps 84 and 86) continues until the scan status parameter indicates that the scan is complete.

In this embodiment, the billing identification numbers identify only those calls that have been terminated. Thus, the SCP 20 can infer that calls that were not identified in the "unrelcalldata" return result message 86 are still ongoing and can continue charging for those calls. For calls that were terminated during the SCP failure period, on the other hand, the SCP 20 can adjust the account balance for the mobile station subscribers involved in the terminated calls at step 88. If the MSC 16 returns data relating to the time of day that the call ended, then the SCP 20 can adjust the account balance such that the total amount deducted corresponds to the length of the call. If the time of day was not included, the SCP 20 can apply its own internal charging algorithm to adjust the account balance for the subscriber involved in that call. Although FIG. 4 illustrates an embodiment of the invention in which there is a failure at the SCP 20, it will be understood that the same procedure can be utilized in connection with other types of failures in the network. For example, if a failure or error occurs that prevents the SCP 20 from receiving call data during a particular period, an "UNRELCALLDATA" message 84 can later be sent, once the failure is discovered and has been corrected, to recover data relating to calls that were terminated during the failure or error period.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for automatically adjusting charges to a pre-paid account following a temporary failure in a network, said charges for a service that was ongoing at the time of the failure, comprising the steps of:

initiating a service, said service chargeable against an account balance for a specific pre-paid subscription during a provision of the service;

terminating the service during a failure in the network, said failure preventing a node in the network used for charging against the account balance from receiving a notification of the termination of service during the failure;

sending a message after a recovery from the failure, said message containing information relating to the service termination and sent to a node in the network used for charging against the account balance; and adjusting the account balance in accordance with the information contained in the message.

2. The method of claim 1, wherein the network comprises a telecommunications network, said service comprising a telecommunications service.

3. The method of claim 2, wherein the telecommunications service comprises a call connection associated with the pre-paid subscription.

4. The method of claim 2, further comprising the steps of:

identifying a rating factor associated with the telecommunications service;

deducting from the account balance periodically in accordance with the rating factor, said periodic deductions beginning with the initiation of the telecommunications service, wherein the failure in the telecommunications network permits the periodic deductions to continue after the termination of the telecommunications service; and wherein the step of adjusting the account balance includes crediting the account balance for deductions occurring after the termination of the telecommunications service.

5. The method of claim 2, wherein the failure in the telecommunications network comprises a failure in a switching node involved in the provision of the telecommunications service, said failure causing the termination of the telecommunications service.

6. The method of claim 5, wherein the information relating to the service termination comprises an indication that the switching node failure caused the termination of the telecommunications service and an indication of the time of the switching node failure.

7. The method of claim 6, wherein the step of adjusting the account balance comprises adjusting the account balance such that a total amount deducted from the account balance for the telecommunications service corresponds to a total duration of the provision of the telecommunications service.

8. The method of claim 2, wherein the message containing the service termination related information includes a list of active call connections involving pre-paid subscriber stations, an absence of the chargeable telecommunications service from the list indicating that the telecommunications service terminated during the failure.

9. The method of claim 2, wherein the message containing the service termination related information includes an indication that the telecommunications service terminated and an identification of the time of the service termination.

10. A method for automatically adjusting charges to a pre-paid account following a temporary failure in a telecommunications network, comprising the steps of:

detecting a failure in a telecommunications network, said failure temporarily preventing a charging node from receiving call connection event data relating to a subscriber station, said charging node used for controlling deductions from a pre-paid account balance for the subscriber station;

transmitting a signal to the charging node following a recovery from the failure, said signal containing status information for call connections in the telecommunications network; and adjusting the pre-paid account balance in accordance with the status information.

11. The method of claim 10, wherein the charging node comprises a service control point in a mobile telecommunications system.

12. The method of claim 10, wherein the status information is sent in response to a request from the charging node.

13. The method of claim 12, wherein the status information comprises an identification of active call connections.

14. The method of claim 13, wherein the step of adjusting the pre-paid account balance comprises deducting from the prepaid account balance in response to an identification of an active call involving the subscriber station, said active call beginning before the failure in the telecommunications network.

15. The method of claim 13, wherein the absence of a call connection involving the subscriber station from the identification of active call connections, said call connection ongoing at the time of the failure, indicates that the call terminated during the failure.

16. The method of claim 12, wherein the status information includes call connection event data previously sent to the charging node, wherein no acknowledgment of the previously sent call connection event data has been received from the charging node.

17. The method of claim 10, wherein the failure causes a termination of a call connection involving the subscriber station.

18. The method of claim 17, wherein the failure comprises a failure in a mobile switching center.

19. The method of claim 17, wherein the status information identifies the time of the failure that caused a termination of the call connection, the step of adjusting the pre-paid account balance further based on the identified time of the failure.

20. The method of claim 10, wherein the status information identifies the time of a termination of the call connection, the step of adjusting the pre-paid account balance further based on the identified time of the termination.

21. A telecommunications system, comprising:

a charging node for controlling deductions from a pre-paid account balance for a subscriber station, said charging node programmed to adjust the pre-paid account balance in accordance with received fault recovery information relating to a service provided to the subscriber station, wherein the service provided to the subscriber station terminates during a failure in the telecommunications system that prevents the charging node from receiving a service termination information message during the failure, said fault recovery information received following a recovery from the failure; and a switching node associated with the service provided to the subscriber station, said switching node generating the fault recovery information.

22. The system of claim 21, wherein the charging node comprises a service control point in a mobile telecommunications network and the switching node comprises a mobile switching center in the mobile telecommunications network.

23. The system of claim 21, wherein the switching node stores data identifying a time of the service termination, the switching node generating the fault recovery information to include the data identifying the time of service termination and sending the fault recovery information to the charging node following the recovery from the failure.

24. The system of claim 23, wherein the switching node detects the failure by determining that an acknowledgment to the service termination information message has not been received.

25. The system of claim 24, wherein the charging node requests the fault recovery information from the switching node following the recovery from the fault.

26. The system of claim 23, wherein the failure comprises a failure in the switching node, said switching node failure causing the service termination.

27. The system of claim 26, wherein the service related information comprises an indication of the switching node failure and a time of the failure.

28. The system of claim 21, wherein the charging node requests a list of active services from the switching node following the recovery from the failure, said fault recovery information generated in response to said request and containing a list of active services in the switching node.

29. The system of claim 28, wherein the charging node adjusts the pre-paid balance for the subscriber station in accordance with whether the service provided to the subscriber station is included on said list of active services.

* * * * *

UNITED STATES PATENT AND TRADEMARK OFFICE
CERTIFICATE OF CORRECTION

PATENT NO. : 6,567,657 B1
APPLICATION NO. : 09/400140
DATED : May 20, 2003
INVENTOR(S) : Holly et al.

It is certified that error appears in the above-identified patent and that said Letters Patent is hereby corrected as shown below:

On the Title Pg, Item (73), Line 2, insert -- (publ), --, before "Stockholm".

In Column 7, Lines 7-8, delete "subscriber s" and insert -- subscriber's --, therefor.

Signed and Sealed this

Twenty-second Day of December, 2009

David J. Kappos
*Director of the United States Patent and Trademark Office*